United States Patent [19]

Castrantas et al.

[11] 4,026,798

[45] May 31, 1977

[54] PERACID TREATMENT OF DRY CLEANING BATHS

[75] Inventors: Harry Marcus Castrantas, Newtown, Pa.; John T. Gresham, Skillman, N.J.

[73] Assignee: FMC Corporation, Philadelphia, Pa.

[22] Filed: Nov. 28, 1975

[21] Appl. No.: 636,076

[52] U.S. Cl. .................. 210/63 R; 8/141; 8/142; 210/60
[51] Int. Cl.$^2$ ........................ B01D 23/00
[58] Field of Search .......... 8/111, 141, 142; 134/8, 134/12, 13; 210/50, 59, 60, 63 R, 167, 51–54; 252/96, 162

[56] References Cited

UNITED STATES PATENTS

| 1,947,873 | 2/1934 | Norquist et al. | 210/59 |
| 3,203,754 | 8/1965 | Young et al. | 210/167 |
| 3,256,198 | 6/1966 | Matzer | 8/111 |
| 3,338,839 | 8/1967 | MacKellar et al. | 8/111 |
| 3,361,528 | 1/1968 | Shen | 210/63 R |
| 3,528,115 | 9/1970 | Lawes | 8/111 |
| 3,677,955 | 7/1972 | Castrantas et al. | 8/142 |

Primary Examiner—Frank A. Spear, Jr.
Assistant Examiner—Peter A. Hruskoci
Attorney, Agent, or Firm—Gary M. Nath; Frank Ianno

[57] ABSTRACT

Peracids and a water-soluble inorganic polyphosphate salt are used in the treatment of dirty dry cleaning baths to permit longer operation between distillation.

12 Claims, No Drawings

PERACID TREATMENT OF DRY CLEANING BATHS

This invention relates to a process for treating dirty dry cleaning baths in the absence of garments with peracids and a water-soluble inorganic polyphosphate salt to permit longer operation between distillations.

The general technique for dry cleaning garments and other articles made of textile fabrics involves treating the textiles with a bath consisting of about 0.1 to 5% of a suitable detergent, and a very small amount of water, usually about 0.02 to 2.0%, both dispersed in a solvent such as a petroleum distillate, chlorinated solvent such as trichloroethylene, perchloroethylene, trifluorotrichloroethane or other highly halogenated solvent. About 5 to 20 times as much solvent bath is used per weight of fabric to insure proper cleaning. Cleaning is generally carried out at room temperature for about 5 to 20 minutes. During cleaning, particles of dirt become suspended in the bath, soluble grease and oils are dissolved, and hydrophilic stains are partially emulsified. The bath can be reused several times by removing suspended dirt and most of the excess moisture by filtration. When the filtered bath becomes too dirty for continued use it is conventionally distilled to produce a clean solvent, which is reformulated into a new dry cleaning bath by adding water and detergent. Distillation, however, is expensive since it entails both operational cost and loss of detergent. Accordingly, it is desirable to reduce the frequency of distillation.

One procedure has been described in U.S. Pat. No. 3,677,955 for postponing distillation for a sufficient time to permit substantial cost savings. The procedure involves agitating a dirty dry cleaning bath with at least 0.25% hydrogen peroxide to partially decolorize and suspend the fine particles of dirt which are subsequently removed from the bath by filtration. The bath is then reused to clean additional garments. While this process has been effective for temporarily postponing the requisite distillation operation, a process is needed to purify dirty dry cleaning baths to even higher levels so the distillation operation is postponed for even longer time periods.

A process has been discovered for treating a dirty dry cleaning bath to permit longer operation between distillations, which comprises: agitating the dirty bath in the absence of garments with a sufficient amount of a peracid which is readily soluble in the bath to provide about 0.001 to 0.15% A.O. based on the weight of the bath, and about 0.05 to 12% of a water-soluble inorganic polyphosphate salt based on the weight of water present in the dry cleaning bath at a pH value between about 5.0 and about 9.0; filtering the bath to remove suspended dirt and fine particles; and recovering a clean dry cleaning bath.

According to the process of this invention, conventional dirty dry cleaning baths consisting of (1) a solvent, (2) a detergent which does not react with peracids, and (3) sufficient amounts of water, preferably about 0.02 to 2.0%, are treated in the absence of garments. Higher amounts of water, that is up to about 30%, may be present depending upon the type of solvent used. A wide range of anionic, cationic and/or nonionic surfactants may also be present, such as the surfactants described in U.S. Pat. No. 3,635,667.

The peracids employed according to the process of the invention must be a more powerful bleaching agent than hydrogen peroxide and must be soluble in a water-solvent dry cleaning bath. The peracids are added directly to the bath as preformed peracids or prepared in situ by the reaction of a peroxygen compound with a peroxygen activator. Preferred preformed peracids include perbenzoic acid, perphthalic acid, permaleic acid, peracetic acid, performic acid, perproprionic acid, p-nitro perbenzoic acid, and m-chloroperbenzoic acid.

The peracids must be employed in sufficient amounts to provide about 0.001 to 0.15% A.O. (Active Oxygen) based upon the weight of the bath, and preferably about 0.002 to 0.004% A.O., whether added as such or prepared in situ. Amounts of peracid which provide above 0.15 weight % A.O. do not significantly improve bleaching performance and are accordingly not economical.

Any in situ prepared peracid which is a more powerful bleaching agent than hydrogen peroxide which is formed reasonably fast by the reaction of the peroxygen compound and the activator at temperatures from about 20° C to 50° C, and which is soluble in the water-solvent dry cleaning bath wll perform adequately. The preferred procedure for preparing the peracid in situ is to admix with conventional agitation means the peroxide compound and the activator in the dry cleaning bath in a molar ratio of 1:0.5 to 2.0, and preferably 1:1 respectively. Most preferably, admixing is performed after the pH value of the bath is adjusted between 5.0 and 9.0 with a sufficient amount of an aqueous alkaline solution. Other well known procedures for preparing peracids in solution may also be employed.

The peroxygen compound must be soluble in the aqueous phase of the bath in order to rapidly form the peracid in sufficient amounts to effectively remove bath impurities. Suitable water-soluble peroxygen compounds include hydrogen peroxide, sodium perborate, sodium carbonate peroxide, sodium pyrophosphate perhydrate, zinc peroxide, magnesium peroxide, calcium peroxide, urea peroxide, and potassium caroate, with hydrogen peroxide preferred.

Suitable peroxygen activators may be selected from a wide range of compounds which react with peroxygen compounds to form the corresponding peracid in the aqueous phase of the bath. The activator must be soluble in the solvent phase of the bath even though the activator may have an affinity for water. It is believed that the solvent acts as an activator reservoir which continuously supplies activator through the water-solvent interface where the activator is rapidily reacted with the peroxygen compound to form the corresponding emulsion soluble peracid. By employing a solvent-soluble activator and a water-soluble peroxygen, sufficient amounts of peracid are generated to clean the dirty bath while avoiding the handling of organic peracids.

The activator may be a material selected from the group consisting of aliphatic acids, carboxylic acid anhydrides and mixed anhydrides, amide derivatives, reactive esters, aryl sulfonyl chlorides, diacyl peroxides and miscellaneous activators.

Suitable aliphatic acids include formic acid, acetic acid, and propionic acid, with formic acid preferred because it forms a peracid rapidly and directly without a separate acid catalyst being needed.

Suitable carboxylic acid anhydrides and mixed anhydrides include phthalic anhydride, 4-chlorophthalic anhydride, benzoic anhydride, octenylsuccinic anhydride, nonenylsuccinic anhydride, acetic anhydride, phthalic/benzoic anhydride, succinic/benzoic anhydride, succinic/phthalic anhydride, maleic/benzoic anhydride, tetrahydrophthalic anhydride, trimellitic anhydride, maleic anhydride, glutaric anhydride, acetic/propionic anhydride, 1,2,4,5-benzenetetracarboxylic anhydride, O-sulfobenzoic anhydride, azelaic anhydride, polyazelaic polyanhydride, and 3,3',4,4'-benzophenonetetracarboxylic dianhydride; with the first five anhydrides being preferred. While acetic anhydride is suitable, it is not recommended in view of the possible formation of explosive diacetyl peroxide which may accompany the reaction between acetic anhydride and hydrogen peroxide.

Suitable amide derivatives include N-benzolysuccinimide, N-benzoylcaprolactam, N-benzoyldimethylhydantoin, benzoyliminodiacetonitrile, N,N-dicyanomethylpropionamide, tetraacetylethylenediamine, tetraacetylglycoluril, N-acetylsuccinimide and N-methyldiacetamide.

Suitable reactive esters include the esters of phenols: phenyl benzoate, o-carboxyphenyl benzoate, chlorophenyl benzoate, phenyl acetate, p-cresyl acetate, and p-bromophenyl benzoate; the esters of polyhydric alcohols containing several ester groups situated on adjacent carbon atoms: mannitol hexacetate, sorbitol hexacetate, and triacetin; the esters of mono- and disaccarides containing 3 or more ester groups on adjacent carbon atoms: glucose pentaacetate, sucrose octaacetate, fructose pentaacetate, and glucose tetraacetate; the esters having two ester groups attached to the same carbon atoms: methylene dibenzoate, trichloroethylene dibenzoate, chloral diacetate, furfural diacetate and benzaldhyde diacetate; the esters of enolic forms of ketones: cyclohexenyl acetate, and isopropenyl acetate; the esters of N-substituted hydroxylamides: such as acetylacetohydroxamic acid, the esters of alcohols containing electron-attracting substituents: such as trichloroethyl acetate; the phenyl carbonate esters: such as p-sulophenyl ethyl carbonate, and the esters of cyanuric acid: such as trisacetyl cyanurate, diacetyl cyanurate, and sodium diacetyl cyanurate.

Suitable aryl sulfonyl chlorides include 4-chlorobenzenesulfonyl chloride, benzenesulfonyl chloride, 2,5-dichlorobenzenesulfonyl chloride, 3,4-dichlorobenzenesulfonyl chloride and p-toluenesulfonyl chloride. The diacyl peroxides such as glutaryl-benzoyl peroxide, benzoyl peroxide and lauroyl peroxide; as well as miscellaneous activators such as N-benzoylimidazole, N-benzoylazalines, N-benzoylazole, isophoroneoximino acetate and chloroformates.

The water-soluble inorganic polyphosphate salt is employed in sufficient amounts to enable the polyphosphate salt to remain soluble in the water present in the bath, thus eliminating unnecessary and wasteful salt precipitation. This amount may vary from about 0.05 to 12.0 weight % polyphosphate salt based on the weight of water present, but is most preferably from about 0.3 to 2.0 weight % depending upon the solubility limit of the polyphosphate salt employed. For example, sodium tripolyphosphate is soluble in water at 25° to about 50° C to the extent of about 15% whereas tetrasodium pyrophosphate is soluble in water at 25° C to the extent of about 6% but at 50° C it is soluble to the extent of about 13%. The polyphosphate salt must be nonvolatile so that it can be easily removed from the dry cleaning bath during the distillation operation conventionally used to reclaim the solvent. Examples of water-soluble inorganic polyphosphate salts include sodium tripolyphosphate, tetrasodium pyrophosphate, potassium tripolyphosphate, tetrapotassium pyrophosphate, sodium acid pyrophosphate, and glassy phosphates such as Hexaphos, Sodaphos and Glass H, with sodium tripolyphosphate preferred. By adding small amounts of a polyphosphate salt to the dirty dry cleaning bath, significant improvement in the bleaching operation is noted.

The optimum pH value of the bath during treatment is between about 5.0 and about 9.0, and preferably between about 5.0 and 6.0. The pH value of the bath is brought to these levels by addition of the polyphosphate salt alone and if necessary, it is accompanied by the addition of other alkali, such as sodium hydroxide, sodium bicarbonate, and sodium carbonate preferably as aqueous alkaline solutions. The pH value of the bath must be kept above about 5.0 to avoid equipment corrosion. Likewise, the pH value of the bath must be kept below about 9.0 to avoid formation of odors resulting from the reaction of the polyphosphate salt with amine based surfactants, such as the isopropyl amine salt of an alkyl benzene sulfonate, as well as to avoid excessive peracid decomposition which progressively increases as the pH value of the bath becomes alkaline.

The dirty dry cleaning bath is treated for a short period of time, typically 5 to 120 minutes and preferably 10 to 30 minutes at temperatures from 20° to 55° C, and preferably from 25° to 40° C under agitation to assure prompt and efficient reaction between the dry cleaning bath impurities and the peracid and water-soluble inorganic polyphosphate salt.

Normally, under the conditions employed the peracid used is decomposed by the end of the treatment. If necessary, any residual peracid may be decomposed by conventional procedures, such as catalytic decomposition or elevated temperature decomposition, to form harmless by-products and the bath is reused to clean additional garments.

The invention will be better understood from a consideration of the following examples. All percentages are based upon weight unless otherwise indicated.

EXAMPLE

Inventive Runs 1 and 2

Separate 60 milliliter portions of a commercial dirty dry cleaning bath containing perchloroethylene, 1% of a nonionic-anionic detergent blend and 0.7% organic soluble soil were stirred with the formulations set forth in the Table without fabric present at 30° C for 30 minutes. The treated baths were dried to remove excess water by mixing them with 5 grams of anhydrous magnesium sulfate and then filtered to remove suspended solids. Percent light transmittance values were determined with a Beckman spectrophotometer at 500 m$\mu$ prior to and after treatment. A percentage increase of a few points in light transmittance is considered significant, since this is correlative with the increased number of times that the cleaning bath can be reused before the purification operation is used to reclaim the solvent.

Comparative Run A

The process of Inventive Run 1 was repeated, except that hydrogen peroxide and sodium tripolyphosphate were used in place of the in situ generated peracid. Results are set forth in the Table.

TABLE

|  | Control | 1 | 2 | A |
|---|---|---|---|---|
| Dirty Commercial Cleaning Bath | 60 ml | 60 ml | 60 ml | 60 ml |
| Water | 1.3 ml | 1.0 ml | 0 | 1.0 ml |
| 6.3% STPP* | 0 | 0.33 ml | 0.33 ml | 0.33 ml |
| 1 N NaOH | 0 | 1.3 ml | 1.0 ml | 0 |
| 11.8% $H_2O_2$ | 0 | 0.15 ml | 0.15 ml | 0.15 ml |
| Phthalic Anhydride | 0 | 0.075 ml | 0.075 ml | 0 |
| Bath pH | 6.3 | 8.9 | 6.4 | 7.2 |
| % Transmittance at 500 m$\mu$ | 72.0% | 80% | 81% | 74% |

*sodium tripolyphosphate

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for treating a dirty dry cleaning bath containing a solvent, a detergent which does not react with peracids, and water to permit longer operation between distillations, which comprises: agitating said dirty bath in the absence of garments with a sufficient amount of an organic peracid which is readily soluble in the bath to provide about 0.001 to 0.15% active oxygen based on the weight of the bath, and about 0.05 to 12% of a water-soluble inorganic polyphosphate salt based on the weight of water present in the dry cleaning bath, at a pH value between about 5.0 and about 9.0; filtering the bath to remove suspended dirt and fine particles; and recovering a clean dry cleaning bath.

2. The process of claim 1, wherein a sufficient amount of peracid is employed to provide about 0.002 to 0.004% A.O.

3. The process of claim 1, wherein the amount of said polyphosphate salt is about 0.3 to 2.0%.

4. The process of claim 1, wherein the pH value is between 5.0 and 6.0.

5. The process of claim 1, wherein the peracid is selected from the group consisting of perbenzoic acid, monoperphthalic acid, permaleic acid, peracetic acid, performic acid, perpropionic acid, p-nitroperbenzoic acid, and m-chloroperbenzoic acid.

6. The process of claim 1, wherein the peracid is perbenzoic acid.

7. The process of claim 1, wherein the water-soluble inorganic polyphosphate salt is selected from the group consisting of sodium tripolyphosphate, tetrasodium pyrophosphate, potassium tripolyphosphate, tetrapotassium pyrophosphate, sodium acid pyrophosphate, and glassy phosphates.

8. The process of claim 1, wherein the water-soluble inorganic polyphosphate salt is sodium tripolyphosphate.

9. The process of claim 1, wherein the bath is agitated at temperatures from 20° to 55° C for about 5 to 120 minutes.

10. The process of claim 1, wherein the bath is agitated at temperatures from 25° to 40° C for about 10 to 30 minutes.

11. The process of claim 1, which comprises reacting in the dirty dry cleaning bath a peroxygen compound and an activator for said peroxygen compound, said peroxygen compound being soluble in the water phase of the emulsion and said activator being soluble in the solvent phase, and agitating the bath to supply activator to the water phase where the activator is rapidly reacted with the peroxygen to form the corresponding peracid.

12. The process of claim 11, wherein the peroxygen compound is hydrogen peroxide, the activator is phthalic anhydride, and the peracid formed is monoperphthalic acid.

* * * * *

UNITED STATES PATENT OFFICE
CERTIFICATE OF CORRECTION

PATENT NO. : 4,026,798
DATED : May 31, 1977
INVENTOR(S) : Harry M. Castrantas and John T. Gresham It is certified that error appears in the above-identified patent and that said Letters Patent are hereby corrected as shown below:

Column 2, line 21, "50°C" should read --55°C--; column 2, line 22, "wll" should read --will--. Column 3, lines 26 and 27, "disaccarides" should read --disaccharides--; column 3, line 39, "p-sulophenyl" should read --p-sulfophenyl--. Column 4, line 12, "5.0 and 6.0" should read --5.0 and about 6.0--.

Signed and Sealed this

Eleventh Day of October 1977

[SEAL]

Attest:

RUTH C. MASON
Attesting Officer

LUTRELLE F. PARKER
Acting Commissioner of Patents and Trademarks